(No Model.)
H. FRANK.
GLASS FURNACE.
No. 268,213.  Patented Nov. 28, 1882.
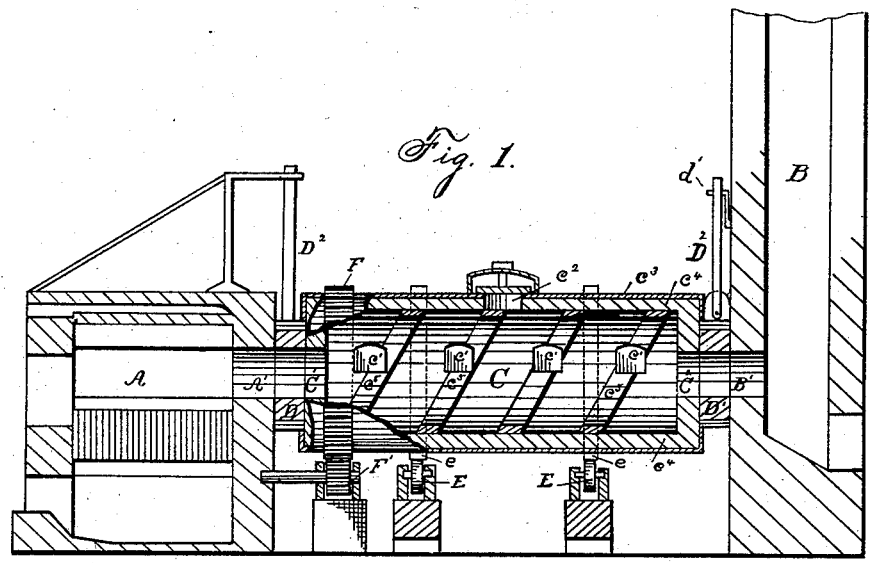
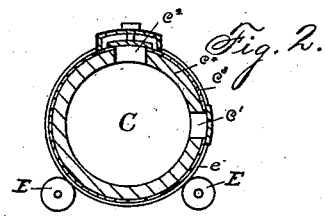
WITNESSES
Samuel E. Thomas
J. Edward Warren
INVENTOR
Himan Frank
By W. W. Leggett,
Attorney

UNITED STATES PATENT OFFICE.

HIMAN FRANK, OF DETROIT, MICHIGAN.

GLASS-FURNACE.

SPECIFICATION forming part of Letters Patent No. 268,213, dated November 28, 1882.

Application filed February 17, 1882. (No model.)

*To all whom it may concern:*

Be it known that I, HIMAN FRANK, of Detroit, county of Wayne, State of Michigan, have invented a new and useful Improvement in Glass-Furnaces; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a longitudinal central section of an apparatus embodying my invention. Fig. 2 is a cross-section through the melting-chamber.

In the manufacture of glass it has been customary to locate crucibles within a suitable furnace-space. The glass material was placed within the crucibles and the fuel in the space outside of the crucibles, so that the glass material was melted by the heat which penetrated through the crucible, or which reached the material directly through the open top of the crucible. As a consequence of the very high heat necessarily employed in the manufacture of glass, and this heat being directed upon the exterior of the crucibles, the very best and most refractory materials used in the construction of the crucibles would very soon become cracked or destroyed by the heat, necessitating a renewal of the same. Again, in case a crucible should cool without having emptied it of its glass, the crucible would thereby be injured or destroyed. For this and many other reasons, obvious to manufacturers of glass by the old process, it was rendered very expensive, and this necessarily showed itself in the market value of the articles produced.

It is the object of my invention to overcome this difficulty, to effectually melt the glass with a much lower degree of heat, and to effect the melting without material injury to the melting-chamber.

To this end, A is a furnace of any suitable construction. B is the smoke-flue or chimney; C, the melting-chamber. The chamber C is provided with openings $C'$ and $C^2$, the former corresponding with a similar opening, $A'$, in the furnace, and the latter corresponding to a similar opening, $B'$, in the smoke-stack.

D and $D'$ are collars suitably lined with fire-brick or refractory material, and which fill the space between the melting-chamber and the furnace and the melting-chamber and the stack, respectively. These collars are suspended by any suitable means, $D^2$, and the collar $D'$ may be provided with means, $d'$, whereby it may be raised or lowered to cut off more or less the draft through the passage $B'$, thereby serving as a damper.

The melting-chamber C is in the nature of a cylindrical drum, provided with a suitable number of working-holes, $c'$, and a removable charging-door, $c^2$. This drum I make preferably of a boiler-iron or other metallic shell, $c^3$, and line it upon the inside at $c^4$ throughout with fire-clay tiling or other suitable refractory material. The working-holes are, like the charging-hole, closed by suitable doors. This melting cylinder or chamber is mounted upon a series of anti-friction rollers, E, which retain the cylinder always in place. These rollers impinge against a suitable band or track, $e$. The cylinder is also provided with a rack, F, which meshes with a pinion, $F'$, so that when power is applied to drive the pinion it serves to rotate the melting chamber C about its axis.

The operation of this device is as follows: The glass materials are placed within the cylinder through the charging-door, when the latter, together with the working-holes, are all closed. Heat from the furnace A is then permitted to pass through the melting-chamber to the flue B, the melting-chamber being in the meantime slowly revolved. As the glass material drops from the side to the bottom it is constantly exposing a new surface to the heat, while it is constantly falling upon a portion of the cylinder which is highly heated. It is apparent, therefore, that the glass is receiving the effects of the heat in the most direct manner. The heat is not required to penetrate through the fire-clay lining from the exterior. The glass materials therefore are quickly melted.

$c^5$ represents spiral ribs formed upon the lining on the interior of the melting-chamber, the object being to agitate the glass materials and by the spiral form of the ribs to constantly force the material toward the furnace end of the chamber, so that the whole contents of the chamber shall be uniformly exposed to the same degree of heat. Of course these ribs may, if desired, be dispensed with; but I prefer to employ them.

The collars D and D' are loosely supported in their place, so that they can be moved if necessary, and serve to prevent the glass from cementing the end of the cylinder to either the smoke-stack or the furnace.

If it is necessary for any reason to discharge the cylinder, it can be readily done by removing the door which covers the charging-orifice and then rotating the cylinder so as to permit the metal to pour out from this orifice into a water-vat or other receptacle. In the meantime the heat can be maintained at a high degree, so that the glass will be entirely discharged. It can now, if necessary, be recharged with other materials for a different quality of glass, and without necessarily cooling down. If, however, it is necessary or desirable to cool it down, it can be accomplished without material injury to the interior lining, and if any part of the lining has been damaged that part alone can be replaced without disturbing the balance, or it can be repaired with fire-clay mortar. It is apparent that by this process the consumption of fuel is very greatly economized, and the expense of breakage, repairing, and replacing the crucibles, &c., is reduced to the minimum, and the expense of the product is therefore greatly reduced. Moreover, the effects of uniform heat and thorough mixture of the ingredients render the glass homogeneous in its character and of better quality. In this connection I do not limit myself solely to the cylindrical form of the melting-chamber.

There may be employed both the collars, D and D', and I so prefer generally to employ them; but either collar may be dispensed with, or both, and in the latter case other means may be adopted for preventing the sealing of the end of the cylinder to adjacent parts. I deem it advisable, however, to always employ a collar or its equivalent, especially at the discharge end adjacent to the stack.

I am aware that glass-melting furnaces have been made of metal cylinders and mounted upon anti-friction rollers lined with a refractory material, and provided with charging and working holes in their circumference and an opening at each end, one of which is connected with a furnace and the other to a chimney, so that the products of combustion can pass from the furnace through cylinder and heat its contents. In addition to these features I show collars suspended between the ends of the cylinder and the chimney and furnace for the purpose above set forth, means for revolving the cylinder on the rollers, and spiral ribs formed upon the interior of the cylinders to agitate the glass. Therefore

What I claim as new is—

1. In apparatus for the manufacture of glass, the revolving melting-chamber consisting of a metallic shell lined with fire-clay or other refractory material, and provided with spiral ribs and one or more working-holes for the introduction of the glass-blower's tools, substantially as described.

2. The combination, with a furnace, a stack, and a revolving melting-chamber, of intermediate detachable collars, D D', suspended between the ends of the chamber, substantially as described.

3. The collar D and means for elevating or depressing the same, whereby it is made to serve the purpose of a damper, substantially as described.

In testimony whereof I sign this specification in the presence of two witnesses.

HIMAN FRANK.

Witnesses:
J. EDWARD WARREN,
N. S. WRIGHT.